US011804758B2

(12) United States Patent
Nogarede (10) Patent No.: US 11,804,758 B2
(45) Date of Patent: Oct. 31, 2023

(54) ELECTRIC MOTOR STATOR COMPRISING COMPACT WINDINGS AND METHOD FOR MANUFACTURING SUCH A STATOR

(71) Applicant: BNCE, Coursan (FR)

(72) Inventor: Bertrand Nogarede, Coursan (FR)

(73) Assignee: BNCE, Coursan (FR)

( * ) Notice: Subject to any disclaimer, the term of this patent is extended or adjusted under 35 U.S.C. 154(b) by 106 days.

(21) Appl. No.: 16/968,019

(22) PCT Filed: Feb. 21, 2019

(86) PCT No.: PCT/FR2019/050402
§ 371 (c)(1),
(2) Date: Aug. 6, 2020

(87) PCT Pub. No.: WO2019/162625
PCT Pub. Date: Aug. 29, 2019

(65) Prior Publication Data
US 2021/0184547 A1    Jun. 17, 2021

(30) Foreign Application Priority Data
Feb. 22, 2018   (FR) ........................................ 1851517

(51) Int. Cl.
*H02K 15/04*   (2006.01)
*H02K 3/18*    (2006.01)
(Continued)

(52) U.S. Cl.
CPC ........... *H02K 15/022* (2013.01); *H02K 1/141* (2013.01); *H02K 3/18* (2013.01); *H02K 15/0414* (2013.01);
(Continued)

(58) Field of Classification Search
CPC .............................. H02K 3/18; H02K 15/0414
See application file for complete search history.

(56) References Cited

U.S. PATENT DOCUMENTS 6,076,251 A * 6/2000 Murata .................... H02K 3/18
310/180
6,548,933 B2   4/2003 Yasuhara et al.
(Continued)

FOREIGN PATENT DOCUMENTS

CH          108795 A       2/1925
DE       19637288 A1 * 10/1997  ......... H02K 15/0435
(Continued)

OTHER PUBLICATIONS

International Search Report issued in PCT Patent Application No. PCT/FR2019/050402 dated May 8, 2019.

*Primary Examiner* — Livius R. Cazan
(74) *Attorney, Agent, or Firm* — MARSHALL, GERSTEIN & BORUN LLP (57) ABSTRACT

An electric motor stator includes a magnetic circuit having a plurality of radial polar protuberances. The stator has, for all or some of said protuberances, a set of conductive zones in the general shape of a U, disposed around the protuberance, and the ends of each of the conductive zones are located in the vicinity of a common plane. The stator also has at least one connection component including a plurality of conductive tracks connected to distinct ends of said conductive zones, so as to define a DC electric circuit forming a winding around one or more radial polar protuberances.

11 Claims, 8 Drawing Sheets

(51) Int. Cl.
*H02K 15/02* (2006.01)
*H02K 1/14* (2006.01)
*H02K 15/06* (2006.01)

(52) U.S. Cl.
CPC ....... *H02K 15/062* (2013.01); *H02K 2203/09* (2013.01)

(56) References Cited

U.S. PATENT DOCUMENTS

| | | | | |
|---|---|---|---|---|
| 2001/0010442 | A1* | 8/2001 | Yasuhara | H02K 3/12 310/201 |
| 2011/0210558 | A1* | 9/2011 | Stiesdal | H02K 3/18 290/55 |
| 2013/0212869 | A1* | 8/2013 | Muniz Casais | H02K 15/0414 29/598 |

FOREIGN PATENT DOCUMENTS

| | | |
|---|---|---|
| FR | 2362479 A1 | 3/1978 |
| JP | H07163100 A | 6/1995 |
| JP | 2005137174 A | 5/2005 |
| WO | WO-2010079278 A1 | 7/2010 |
| WO | WO-2013168262 A1 | 11/2013 |
| WO | WO-2015155899 A1 * 10/2015 ............... H01F 5/00 |  |

* cited by examiner

ELECTRIC MOTOR STATOR COMPRISING COMPACT WINDINGS AND METHOD FOR MANUFACTURING SUCH A STATOR

TECHNICAL FIELD

The present disclosure relates to the electrotechnical field, and more specifically that of rotary machines. More specifically, it targets a specific structure for motor stator coils, and also a production method with which to get advantages in terms of compactness and switching frequency of the supply circuit of the motor.

BACKGROUND

Typically, electric motors stators are composed of a magnetic circuit with a central opening intended to receive a rotor. This magnetic circuit comprises a peripheral yoke from which extend various radial protuberances forming stator poles directed towards the rotor. Each of these protuberances receives a coil intended to be supplied by one phase of a set of currents or voltages generating a rotating alternating field.

Typically, the coils are made separately, by winding a wire onto a form having the shape of the stator pole. After production, these coils are inserted into the inner volume of the stator, and then placed on the polar protuberances. It can therefore be seen that this type of placement method comprises some constraints.

Indeed, the inner volume corresponding to the dimensions of the rotor must be sufficient to be able to receive each of the coils before they are fitted onto the stator pole. This therefore requires limiting the depth of each pole to a size smaller than the diameter of the rotor. In parallel, the final placement of each coil is done by a radial translation centered on the pole. Thus, the portion of the coil which is first inserted on the pole must be sufficiently narrow to pass between the coils mounted on the two adjacent poles. It follows that an empty volume is generated at the bottom of the cavities receiving the stator coils because of the angular separation between two consecutive poles. Therefore, empty volumes, without electrical conductors, remain in the stator.

In another aspect, this type of coil also has a disadvantage related to the geometry of the circuit during the formation of the winding. Indeed, when the various turns are created by winding around the winding jig, the appearance is noted of a parasitic capacitance between two successive turns because of their proximity. This parasitic capacitance induces a limitation of the maximum frequency that can be used for supplying the stator coils.

In fact, it is necessary to limit this switching frequency to below the resonant frequency corresponding to the LC circuit formed by the inductance of the winding and this parasitic capacitance.

A solution for spacing consecutive turns consists in using winding techniques called "pilgrim step." The solution is however limited because it does not allow a small spacing of successive turns and it also leads to irregular areas in the coil which reduce the electric conductor filling level.

SUMMARY OF THE DISCLOSURE

One of the objectives of the disclosed embodiments is therefore to propose an electric motor structure, and more specifically a stator coil structure thereof, which optimizes the internal volume of the stator for maximizing the ampere-turns of the motor. Another objective is to provide control and reduction of the parasitic capacitance present between turns, and to do this with a high level of reproducibility.

Another objective of the disclosed embodiments is to provide a motor that can operate under high voltages, by control of the breakdown voltage within the coil, as well as operation at higher switching frequency, in order to operate at high speed, and at low harmonic levels.

To do that, the Applicant designed an electric motor stator, which in a known manner comprises a magnetic circuit having a plurality of radial polar protuberances.

In accordance with the disclosed embodiments, said stator is characterized in that it comprises, for all or part of said protuberances, a set of generally U-shaped conductive zones disposed around said protuberance, where the ends of each of said conductive zones are located at a substantially common plane.

Additionally, said stator also comprises at least one connection component comprising a plurality of conductive tracks connected to distinct ends of the conductive zones, so as to define a DC electric circuit forming a winding around one or more radial polar protuberances.

In other words, the disclosed embodiments include producing the stator coil from two distinct parts. A first part forms a set of partial turns, which extend around stator poles. The ends of said conductive zones all open out from one side of the stator, where they are then connected to a connection component, such as a printed circuit, bus bar or similar, which serves to provide individual connections of partial turns.

In that way, the stator winding circuit is defined by the succession of partial turns that are connected to each other through the shared connection component.

In other words, the coil can be produced by axial mounting of the set of partial turns around the stator pole, and then closure of the stator coil via a component directly mounted in a second step.

With this operating mode, the entirety of the volume available in the magnetic circuit of the stator, and in particular the space located between the stator poles, can advantageously be used. In fact, in the existing solutions, the coils are inserted radially by penetration of the stator pole into the central opening of the coil. It is thus necessary that this opening have dimensions larger than the end of the stator pole.

In this way, in the case where this pole has lateral expansions intended to smooth the motor torque, the volume located behind these expansions is to some extent lost.

The geometry of the elements making up the coil is thus particularly advantageous. In practice, the different conductive zones are arranged concentrically around the stator polar protuberance. In other words, the different partial U-shaped turns are arranged in the same plane, and have a radius of curvature of the curved areas thereof that increases going outward. In other words, these partial turns are overlapped with decreasing size one inside the other, with a nearly constant spacing between each of them, forming a flat or curved layer.

In practice, these different layers including overlapped partial turns can themselves be stacked by being juxtaposed along a radial axis. In other words, the different partial turns form a matrix in which each element is defined by the sequence number thereof relative to the stator pole and by the sequence number thereof relative to the rotor.

In practice, the cutouts that separate two successive layers can be flat, and in that way easily producible by techniques such as continuous-wire electro-erosion or cutting by laser beam, waterjet or equivalent.

As a variant, the cuts separating two successive layers can also be curved in order to define turns with substantially constant radial dimensions and having a curvature centered on the axis of rotation of the rotor.

In practice, the volume separating adjacent conductive zones can be filled with electrically insulating resin, thus providing the dielectric strength of the winding. This insulation can also be obtained by using sheets of electrically insulating material inserted between adjacent conductive zones. Such dispositions allow to provide a good dielectric strength of the coil, considering the dimensions of the cuts forming the gap between adjacent turns which can reach several tens to several hundreds of microns, compared with the reduced insulating power of the protective coatings covering the wires of the coils from the prior art, which is of order tens of microns.

With such a disposition, the motor can be used at particularly high supply voltages.

In practice, the connection component providing the electrical link between the various turns can be made in various ways.

For example, a connection component can be used for each polar protuberance, so as to define a winding at each stator pole with the entirety of the turns making up the coil. Conversely, a connection component shared by several polar protuberances, and in particular the set of all the stator coils, can be provided.

In other words, said connection component can be the only one and can provide the connection between the turns at a given stator coil, but also between two different coils and preferably between coils supplied by the same phase of the voltage supply system. Thus, it is possible to combine turns from two coils arranged diametrically by connecting them through the connection component, thus increasing the distance between consecutive turns of a single overall winding.

In practice, this connection component can be made in various forms depending on the applications and the required voltage and current levels. It can thus involve a multilayer printed circuit having tracks whose width is suited to the applied current level. It can also involve a component combining heavier conductors, such as those known under the name bus bar.

In more sophisticated embodiments, it is possible to include active semiconductor elements on said connection component with which to monitor, diagnose, or even reconfigure the coils for correcting a defect or providing an operating point different from that of the original configuration. This reconfiguration can be useful in particular in high speed and high-power machines. Indeed, the disclosed embodiments enable all or part of the turns to be placed in series or in parallel, depending on the conditions of use. Thus, when the magnetic field generated by the stator winding needs to be reduced, it is possible to reduce the number of turns by connecting some turns in parallel, for the same supply current, so as to thus reduce the ampere-turn number. It is also possible to vary the number of turns in real time, so as to control the instantaneous flow, for example at constant current. The number of turns can vary between two opposite extreme values, depending on the number and direction of turns placed in series.

Another aspect relates to a production method for an electric motor stator as described above, thus comprising a stator magnetic circuit comprising a plurality of radial polar protuberances.

In accordance with the disclosed embodiments, this method comprises the following steps:

First, producing in a block of conductive material a plurality of through-cuts, defining a set of generally U-shaped mechanically secured conductive zones around one or more central openings;

Then, insertion of said set of conductive zones into the magnetic circuit with a substantially axial movement until the polar or radial protuberances fill the one or more central openings of said set of conductive zones;

Finally, the attachment on said set of conductive zones of one or more connection components, comprising a plurality of conductive tracks connected to distinct ends of the conductive zones, so as to define a continuous electric circuit forming a winding around one or more radial polar protuberances.

In other words, the method consists of making the coil from a compact material block and making slits therein which define the partial elemental turns. Said block can then be placed on the stator pole by an axial displacement and not by radial threading onto the stator pole.

It follows that with this assembly method the entirety of the volume located between the stator poles can be occupied with wider coils in the area closest to the yoke than in the zone closest to the rotor.

It is clearly understood that such a shape is impossible to insert onto the stator poles by a radial movement because then the windings which were previously inserted would prevent the insertion of subsequent windings.

Because of this production mode, a nearly perfect uniformity of the geometry of the turns and of that of the stator windings is provided with a very clear improvement of the reproducibility of these constructions, compared in particular to coils made manually in the state-of-the-art. As a result of the construction thereof, the coil has ends whose position is precise and identical from one coil to another; these ends thus have the possibility of being used as index or references for positioning additional components with mechanical or electrical functions. The very high production uniformity thus serves to reduce the variability of the parameters of a coil that depend on the geometry thereof, and notably the dielectric strength thereof and also the parasitic capacitances between turns which directly influence the resonant frequency of the coil. The direct consequence of the reduction of the parasitic capacitances is also the reduction and the control of high frequency common mode currents which circulate between the coil and the casing and which are very often the origin of a premature wear of the bearings (even for low-speed machines).

In practice, the method advantageously comprises a step consisting of providing for the securing of the conductive zones by an insulating material. In other words, the spaces between adjacent turns are filled with a material which provides both the electrical insulation function between adjacent turns, and also the securing of this set of partial turns in order to allow handling thereof and holding the shape thereof.

In practice, said insulating material can be a resin contained in a bath into which the set of conductive zones is dipped after execution of the cuts defining the geometry of the partial turns. The filling of these interstices is thus done by an insulator, for example in the form of an insulating resin added under vacuum and later polymerized, while the partial turns are held spatially relative to each other because of a holding stub.

Advantageously in practice, the production method comprises a step consisting of extracting the portion which defines the central opening from the block of conductive material. In practice, the set of conductive zones is also separated from the portion of the block of conductive material providing the secure hold of these conductive zones while the cuts are made. In other words, after the cuts are made that define the partial turns, they are still held secured to each other by a stub of material that remains connected to the set of partial turns. Said stub is then eliminated at the same time as the portion of material that is located in the center of the partial turns, and which is intended to receive the stator pole.

In practice, various techniques can be used for making the various cuts. Continuous-wire electro-erosion is particularly noted since it can define cuts in the form of ruled surface, and advantageously surfaces that are developable in the mathematical sense of the term.

Other techniques can also be considered such as cutting by waterjet or laser, or even electro-erosion techniques by needle, allowing the machining of the block of material by a single surface, thus making curved cuts for defining concentric turns, and also for the separation of successive layers of radially stacked turns.

Different geometric variants can be implemented for producing this stator coil. In that way, it is possible to produce as many individual sets of conductive zones as polar protuberances, so as to insert them individually into the magnetic circuit. In other words, a set of turns is produced for each stator pole, and these different sets are placed independently in the chassis.

Conversely, it is possible to produce a plurality of sets of conductive zones in a single block of conductive material, so as to then insert this complex part into the magnetic circuit of the stator in just one step. In other words, in this case the method consists in making several, or even all, the stator windings (other than the closure portion) in one single block, which can then be inserted axially into the magnetic circuit of the motor in just one step. Of course, depending on industrial constraints, it is possible to produce one or several blocks combining all or part of these stator windings.

In practice, it is possible to make characteristic cuts according to various geometries and orientations.

Thus, in a first embodiment, it is possible to make radial cuts, which pass through the virtual axis of the stator, where these cuts separate concentric turns associated with a single polar protuberance. In other words, two adjacent turns located at the same distance from the axis of the motor are separated by planes passing through the axis of the motor.

In another embodiment, these same planes separating concentric turns can all be parallel and distributed on both sides of a median plane passing through the axis of the motor.

As regards cuts separating adjacent turns located at different distances from the axis of the motor, several possibilities can be implemented.

Thus, these cuts can be flat and perpendicular to the plane of radial symmetry of the stator winding considered.

In another embodiment, these cuts can be cylindrical and centered on the axis of the motor in order to separate the radially offset turns associated with a single polar protuberance. In practice, these cuts can be formed by a hole-saw type circular tool or similar, or else result from the assembly of several concentric cylindrical elements of stepped diameters. In other words, in this case, the block of conductive material is produced by the assembly of several concentric tubes nested on each other, and secured to a holding part, typically a disk. In that way, the cuts for delimiting the conductive zones that form the future turns are made on all of the tubes simultaneously, without requiring later assembly or positioning of the turns relative to each other.

BRIEF DESCRIPTION OF THE FIGURES

The way to implement the disclosed embodiments as well as the advantages deriving therefrom will be clearly seen from the description of the following embodiment, supported by the appended figures in which.

Of course, the various elements shown in the figures have sizes and proportions that can be different from reality and which are only given to improve understanding of the disclosed embodiments.

DETAILED DESCRIPTION

As already mentioned, the disclosure relates to a production method for an electric motor stator coil, as well as the coil and more generally the resulting stator.

Figure 1:
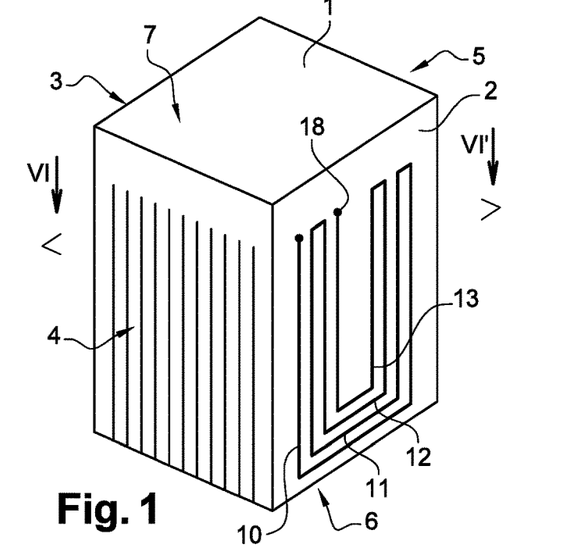
FIG. 1 is a basic perspective view of a block of conductive material on which the various cuts with which to define the partial turns are identified.

To execute this method, as shown very schematically in FIG. 1, a block of conductive material can be used, typically copper-based or equivalent, whose volume corresponds substantially to that of an elemental coil intended to be placed on a stator pole.

This block 1 is machined to produce a set of cuts that will define the elemental turns with which to make the part of the stator coil, which will be inserted inside the stator magnetic circuit.

More precisely, and as shown in FIG. 1, the block 1 comprises a surface 2, which, once the coil has been inserted in the stator, is intended to come into contact with the yoke of the stator. In the remainder of the description, this surface will be considered as the front surface of the block. Thus, the rear surface 3 is the one that will be intended to face the rotor, whereas the lateral surfaces 4 and 5 for their part will face the adjacent stator coils. The lower surface 6 corresponds to the low end of the stator winding, while the upper surface 7 of the block 1 corresponds to the one where the various partial turns will be connected to each other by the connection component discussed above.

The block 1 comprises several series of through-cuts, meaning extending respectively from the front surface 2 to the rear surface 3, and from one lateral surface 4 to the other 5. Specifically, the front surface 2 comprises a set of cuts 10, 11, 12 and 13 which define generally U-shaped patterns on the rear surface, which are nested one inside the other from the largest 10 on the outside to the smallest 13 in the center.

Figure 6:
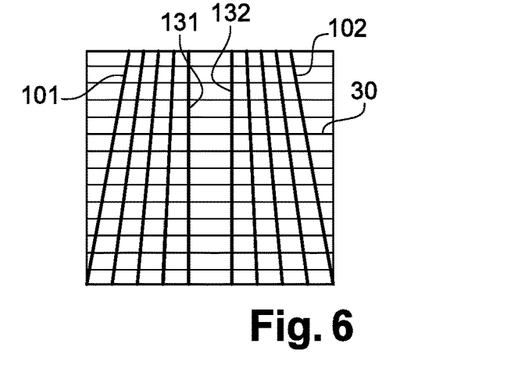
FIG. 6 is a median section view along the plane VI-VI' from FIG. 1.

The central cut 13 substantially corresponds to the contours of the stator pole onto which the future stator coil will be placed. As shown in FIG. 6, these cuts 10-13 pass through from the surface 3 to the rear surface 2. Specifically, these cuts have different angulations. The cut 13 has two substantially parallel sides 131, 132 that are spaced by a distance slightly larger than the dimension of the stator pole measured orthoradially. In contrast, the cut 10 has two sides 101, 102 that form a nonzero angle between them such that the stator coil has a substantially trapezoidal transverse section, wider on the rear surface thereof than on the front surface thereof. In theory, the angle between the sides 101 and 102 can range up to a value of 360° divided by the number of stator poles.

Figure 4:
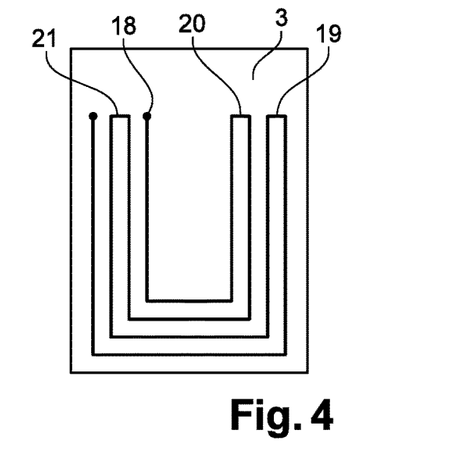
FIGS. 4 and 5 are views of the surfaces of the block from FIG. 1 along orthoradial planes corresponding to surfaces respectively in contact with the yoke of the stator and opposite the rotor.
Figure 5:
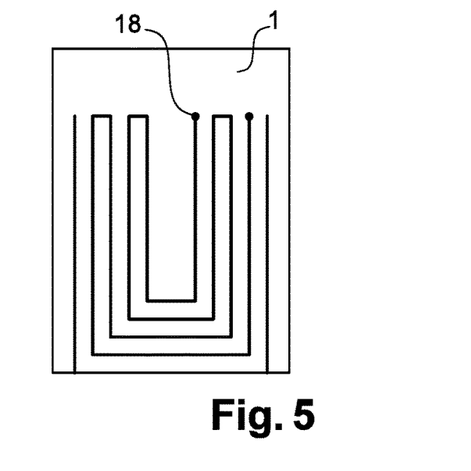

In a specific embodiment, these cuts can be produced by electro-erosion techniques consisting in passing an electrode-forming conductive wire that extends from the front surface 2 to the rear surface 3, by moving it according to the pattern of the various cuts in order to form planes delimiting the future turns. In a specific case, it can be advantageous, as shown in FIGS. 4 and 5, to drill a first hole 18, with a diameter large enough to allow insertion of the electrode wire, in order then to start the cut with a lesser width. Similarly, to improve the manufacturing process, successive U-shaped cuts can advantageously be connected by segments 19, 20, 21 so as to make the various cuts 10-13 continuously, without interruption of the electro-erosion process.

Figure 2:
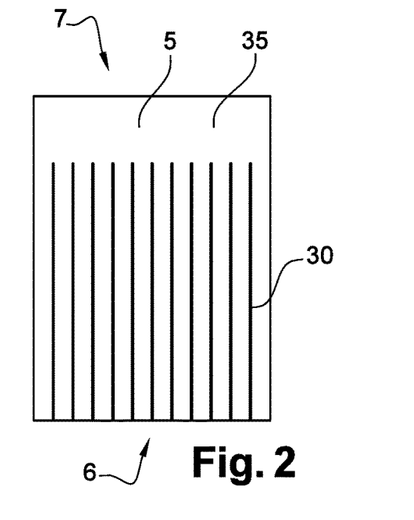
FIG. 2 is a front view of the block from FIG. 1 parallel to the radial plane of the stator winding.
Figure 3:
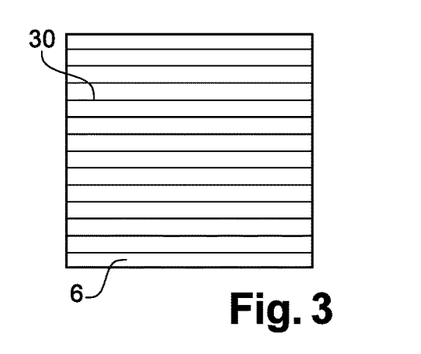
FIG. 3 is a view from below of the block from FIG. 1.

Additionally, the block 1 also comprises another series of cuts extending from one lateral surface 4 to the other 5 along planes parallel to the front surface 2. These cuts can be made as shown in FIG. 2 from the lower surface 6 extending towards the upper surface 7, still leaving an uncut portion 35, serving as a stub providing the overall cohesion of various portions defined between the cuts.

Figure 7:
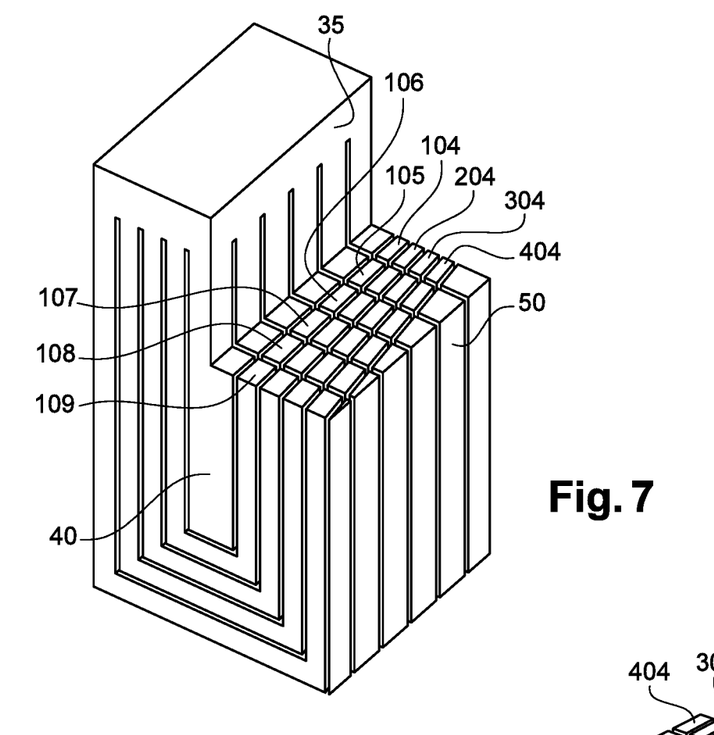
FIG. 7 is a basic perspective view of the block from FIG. 1 in which a fraction was eliminated in order to illustrate the detail of the geometry of the partial turns.

The result of these various cuts is shown in FIG. 7, in which a portion of the block was hidden so as to show a portion of the elemental turns. More specifically, the block machined in that way comprises a central portion 40, which has a volume similar to that of the stator pole onto which the stator coil will be inserted.

The block partially shown in FIG. 7 also comprises the stub 35, which provides the hold for the various layers of partial turns 104-109, 204, 304, 404. In that way, this block is easily handled and can be processed in order to install an insulating coating. More specifically, in a specific case, this block can be dipped in an epoxy or similar resin, which penetrates into the cuts and fills the corresponding volumes. In practice, the filling can be done under vacuum in order to control the penetration of the resin into the cuts between turns and to avoid the appearance of air bubbles which would be detrimental to the dielectric properties. Advantageously, the assembly goes through an oven to ensure polymerization of the resin. It will be noted that the thickness of the insulating material is therefore relatively large, in comparison with the insulation covering the wires of wire-wound coils, because it corresponds substantially to the space of a cut by electro-erosion, of the order of several tens to several hundreds of microns. This space also has the advantage of being very constant and reproducible.

Of course, the electrical insulation of the different turns of the block can be done by other techniques, in particular the insertion of solid materials in the form of insulating sheets. It is also possible to mix two types of insulation, by inserting sheets of insulating material into a portion of the cuts, in particular cuts formed by parallel planes, whereas the other cuts for their part are filled with a liquid resin intended to be solidified.

In a later step, the stub 35 is then removed, which both releases the portions 50 defined between the lateral surfaces 4, 5 of the block, and the outermost cut 10, because of the trapezoidal shape of the future coil. In parallel, the elimination of the stub 35 allows the release of the ends of the set of partial turns, and thus defines a matrix for the connections to be made for finalizing the coil.

Figure 9:
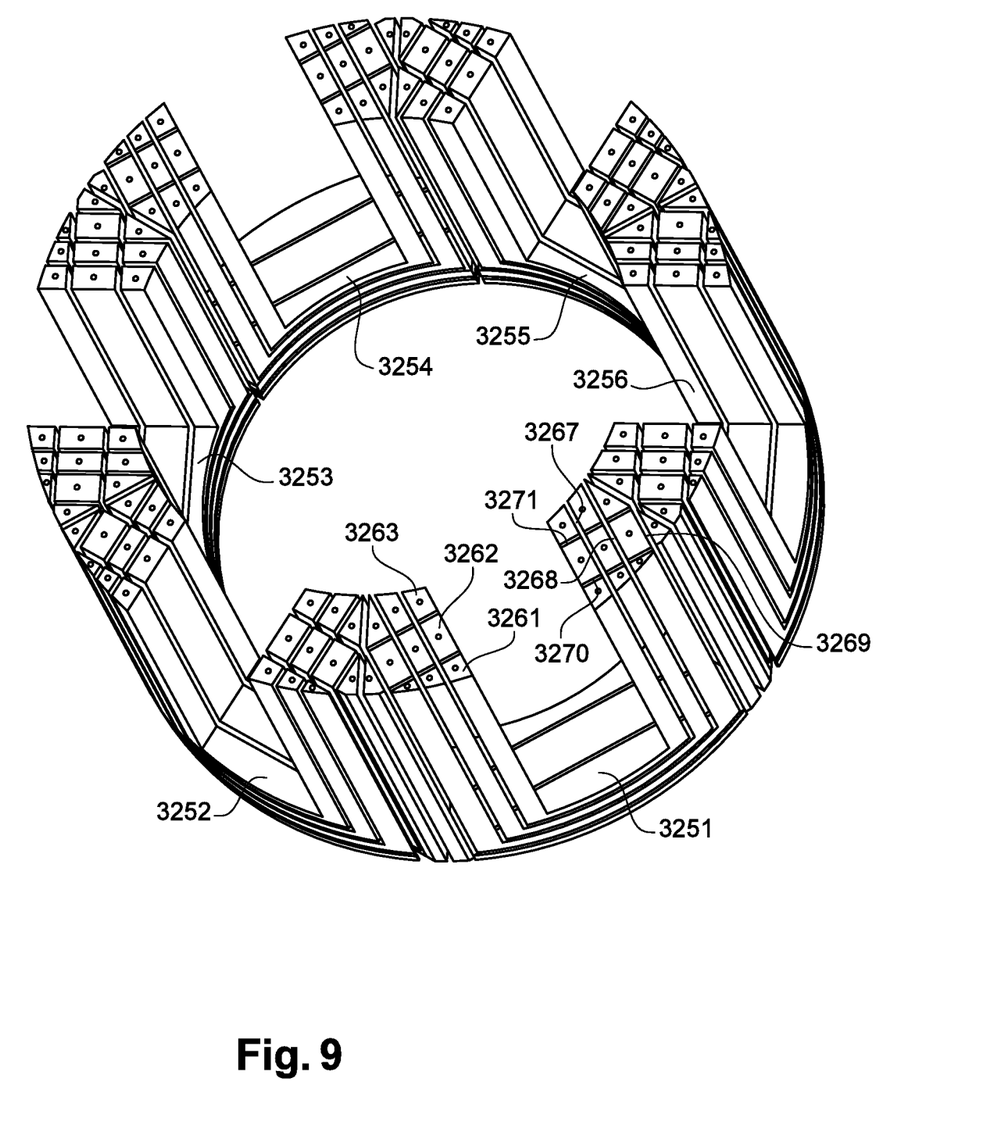
FIGS. 9 to 11 are basic perspective views of assemblies of stator windings analogous to those from FIG. 8, produced according to different variants of cut orientation and geometry.

The variant shown in FIG. 9 shows the assembly of six elemental blocks 3251-3256, each corresponding to one sixth of the overall stator winding. Each block 3251-3256, 3261-3263, is produced by a set of planar cuts 3267-3271. These cuts are subdivided into two groups of mutually perpendicular cuts, defining turns having distinct sections. It is possible to normalize the average section, by making groups in parallel of turns for which the values of sections are farthest removed from the average, by the mechanisms described above and incorporated in the connection component.

Figure 10:
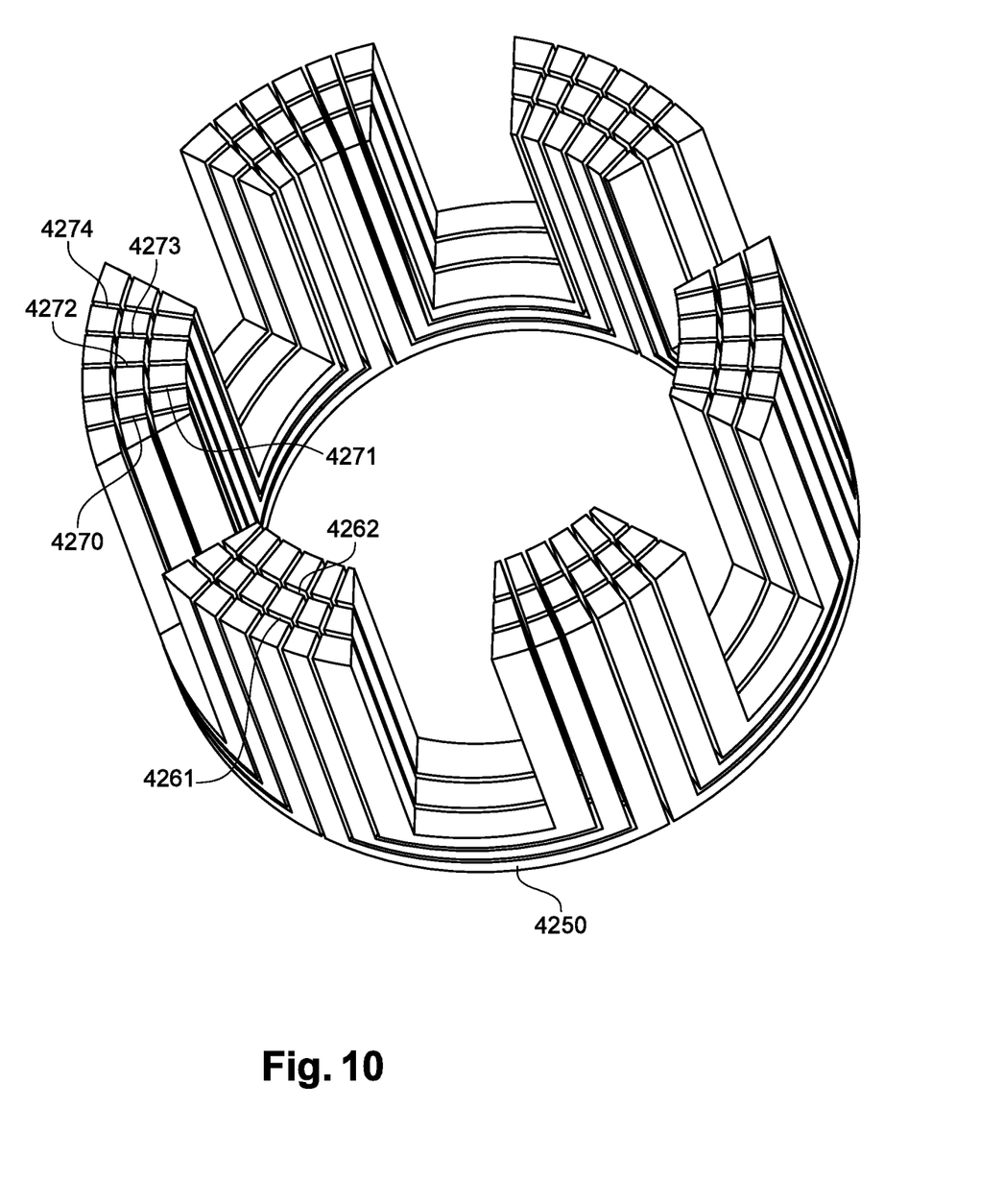

In the variant shown in FIG. 10, the various stator windings are produced in a single block 4250, from two series of distinct cuts. In the example shown, two cylindrical shaped cuts 4261, 4262 are made in the entirety of the block, so as to define three levels of turns, at three distinct distances from the center of the motor. These cuts can be made by concentric slits obtained by electro-erosion and driving in a fine hole-saw, with as many blades as interstices required along the radial direction. As a variant, an equivalent geometry could be achieved by nesting concentric cylindrical metal tubes, with the clearance between tubes corresponding to the space between two levels of radially offset turns. These tubes are embedded in a set of concentric slits of the same average diameter made in a metal disk base, advantageously made by turning. In that way, the tubes are held in position relative to each other to allow making through-cuts defining the radial cuts 4270-4274 formed by the planes passing through the axis of the motor. With this geometry, turns can be made whose section is substantially homogeneous within the stator winding.

Figure 11:
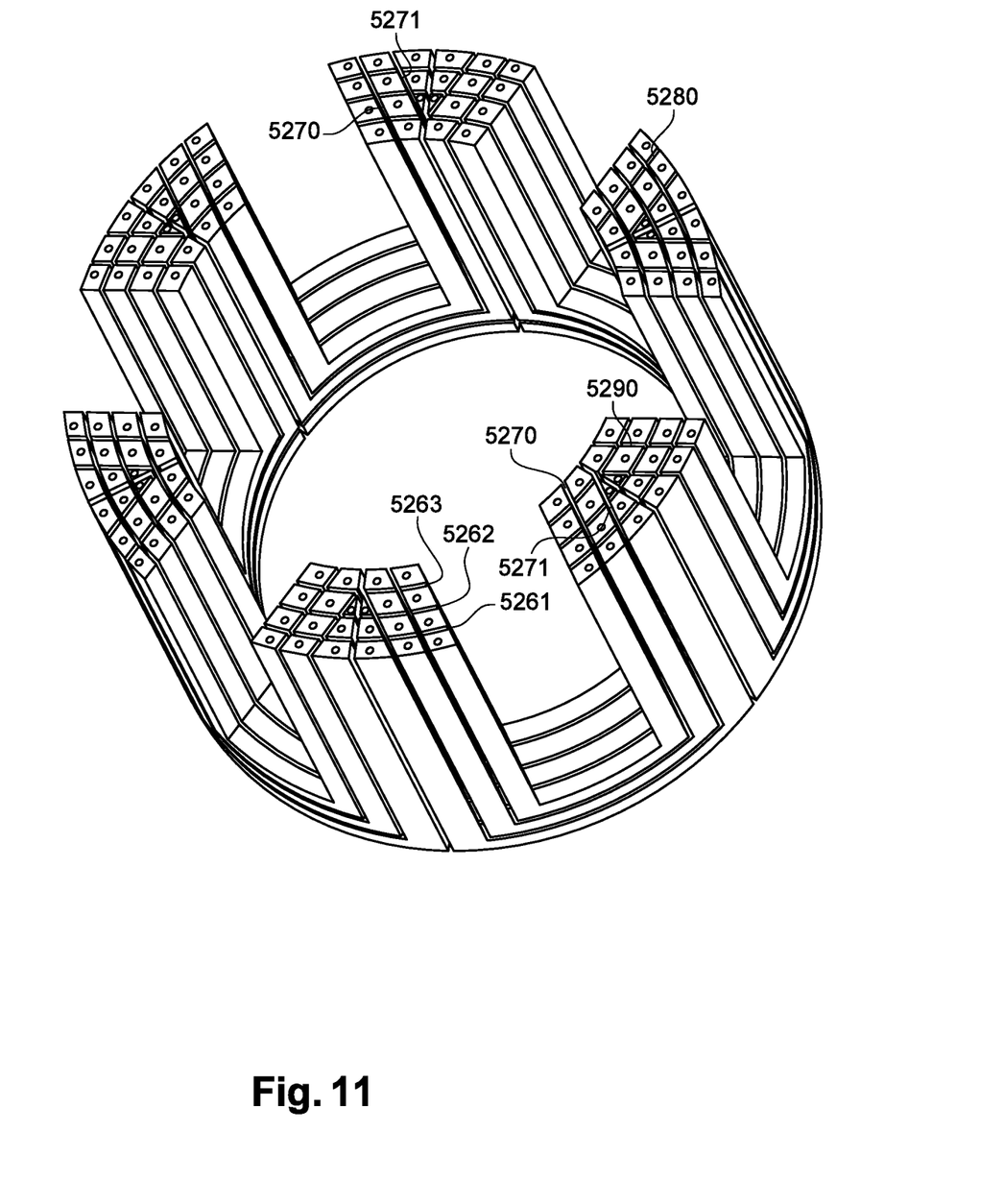

In a variant shown in FIG. 11, the block comprises six stator windings also comprising cylindrical cuts 5261-5163 analogous to those made on the variant in FIG. 10. Additionally, this block receives several groups of flat cuts 5270, 5171, 5280, 5290 along parallel planes, which extend from one side of the block to the other, thus making cuts in the two diametrically opposite stator windings. These cuts are made by electro-erosion, and in the example shown, three series of cuts are used to make all of the turns of the future stator winding.

Figure 8:
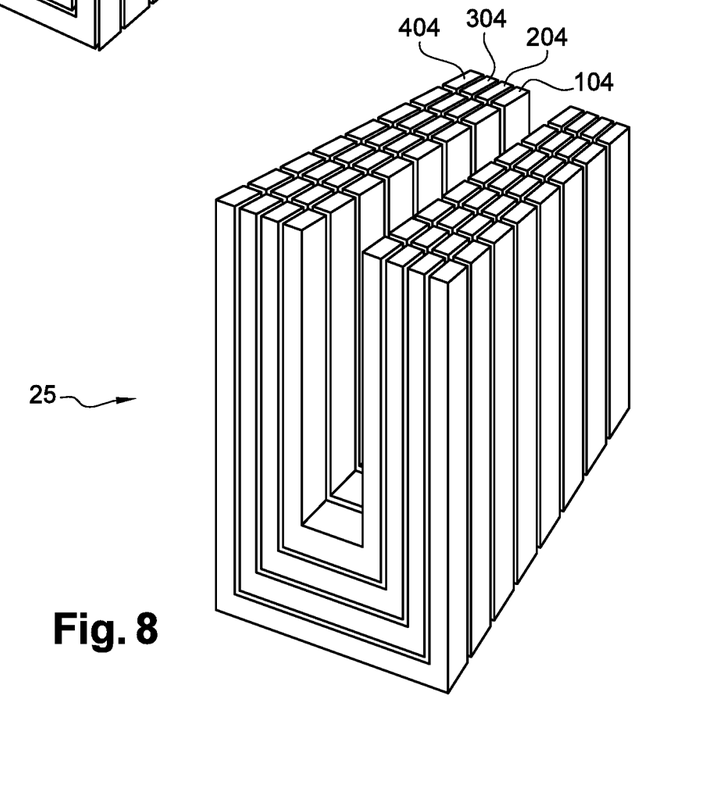
FIG. 8 is a view of the block from FIG. 1, shown after removal of the stub of material gathering the various partial turns together.
Figure 12:
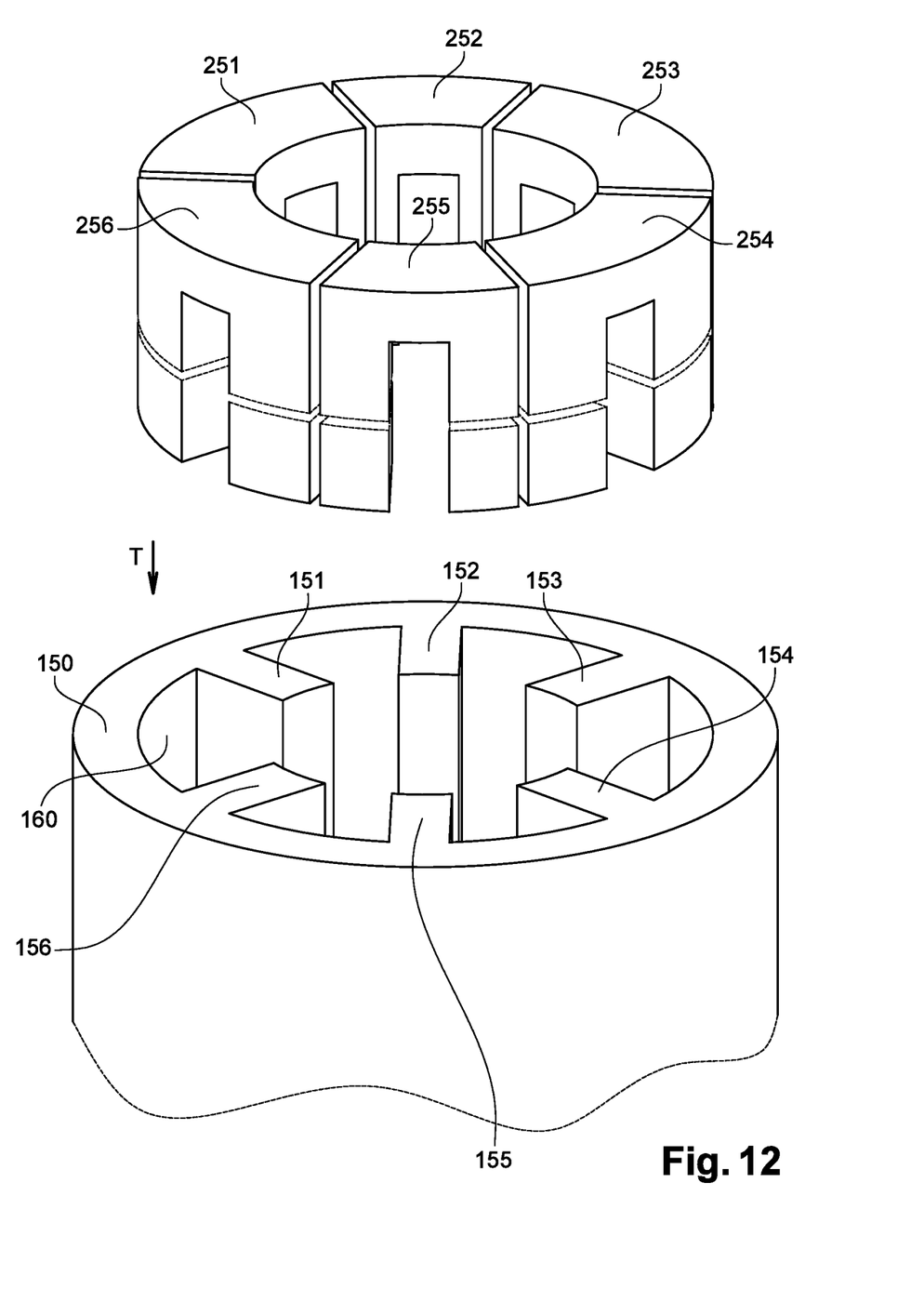
FIG. 12 is a basic perspective view showing the assembly operation inside the stator of the motor of the different blocks from FIG. 8.

Subsequently, as shown in FIG. 12, six of these blocks 251-256 from FIG. 8 are selected in order then to be inserted into the magnetic circuit 150 of the stator. More precisely, this magnetic circuit 150 comprises a peripheral yoke inside which emerge six radial protuberances 151-156, intended to form the poles of the stator. The location of the future rotor of the motor is found at the center of these six protuberances. Thus, by a movement of axial translation, shown by the arrow T, the various blocks 251-256 are inserted astride the polar protuberances 151-156, and fill as much as possible of the volume 160 defined between two successive polar protuberances. It needs to be noted that the installation of these blocks of partial turns can be done independently of the shape of the end of the radial poles, which in a form not shown could include expansions extending orthoradially. It is observed that the filling level of the stator volume is nearly total, compared with values of order 50% for conventional wire coils.

Figure 13:
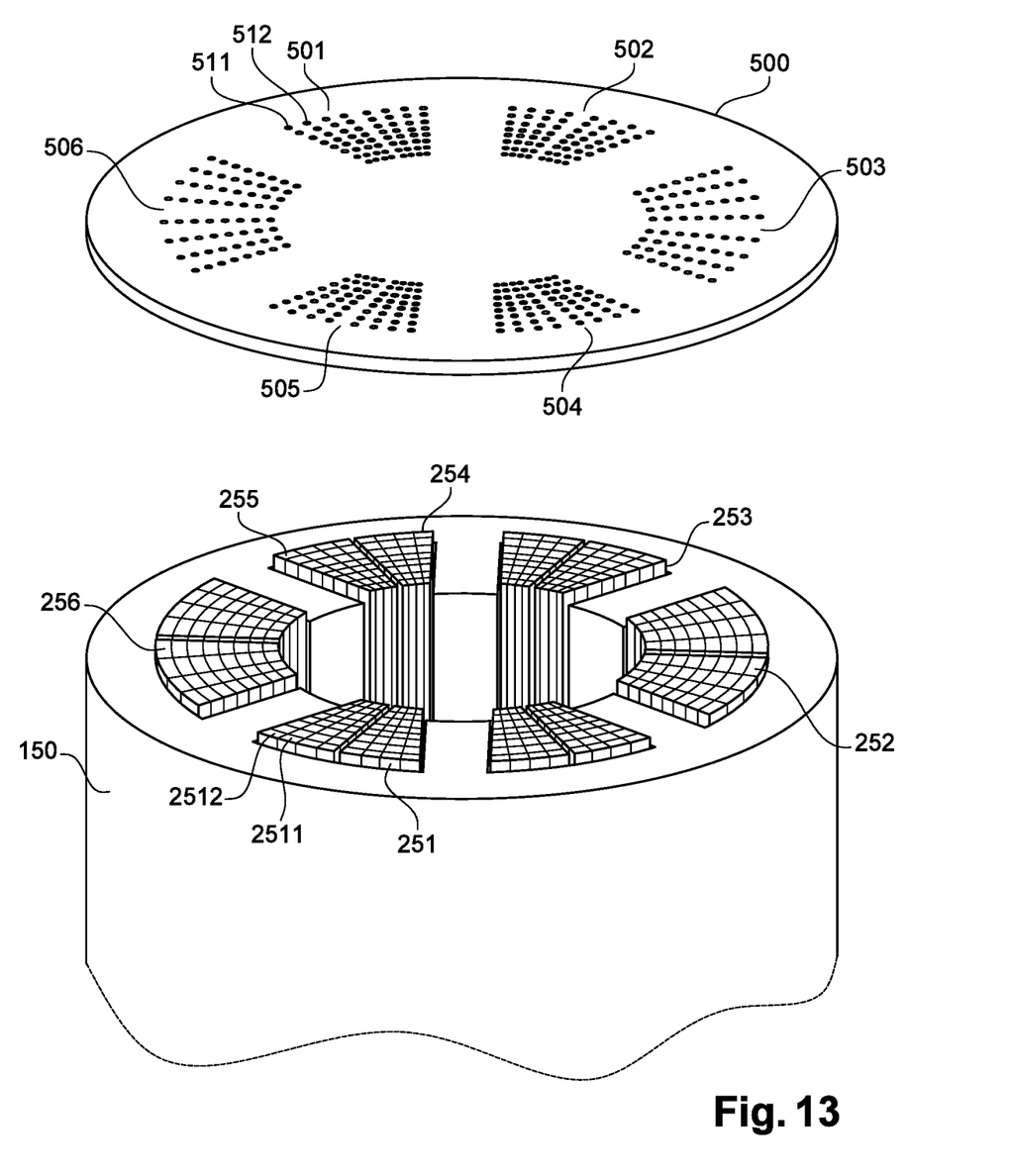
FIG. 13 is a basic perspective view showing the placement of the connection component onto the ends of the blocks inserted into the stator in FIG. 12.

Subsequently, and as shown in FIG. 13, the magnetic circuit 150, equipped with the set of blocks 251-256 forming most of the coils receives a connection component 500, designed for providing the connection between the partial elemental turns in order to form the set of the stator coils. More precisely, this connection element 500 comes in the form of a printed circuit having a plurality of zones 501-506 of connection pads 511, 512. These pads 511, 512 are laid out to face the ends 2512, 2511 of the partial turns emerging from the yoke of the stator. Of course, various connection variants are possible for mounting the connection component onto the sets of partial turns. The use of soldering or even welding flux connecting the connection pads of the connection component and the cut ends of the turns in the bulk metal block can especially be indicated. It is also conceivable that the printed circuit forming the connection component comprises on the surface thereof opposite the coils a set of pins to plug into complementary holes made near the ends of the turns.

Of course, this connection component can be made in other ways than by a printed circuit, in particular with bus bar or similar type metal components. In the form shown, the printed circuit is unique for the set of stator coils, but it is possible to provide a connection component for one or several stator coils.

Figure 14:
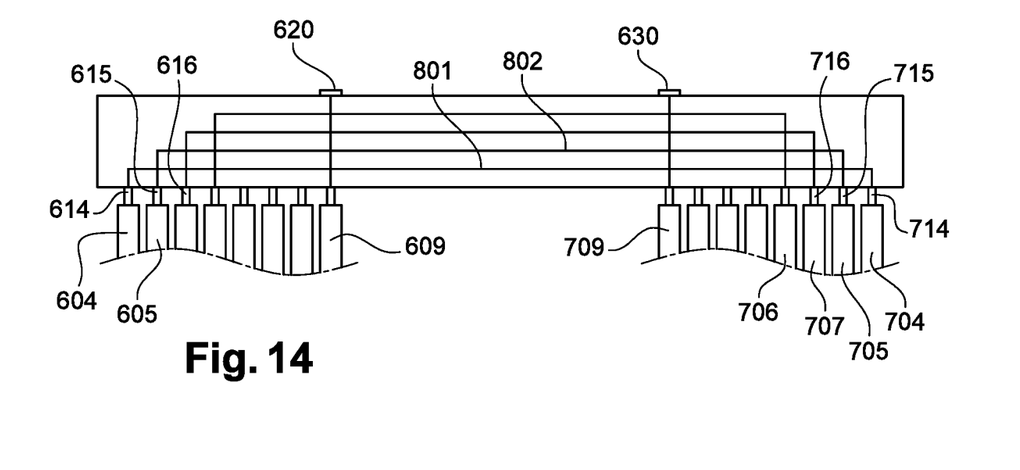
FIG. 14 is a schematic section view along a radial plane of the connection component from FIG. 13 also showing the upper part of the blocks of partial turns on two diametrical stator windings.

The connection component 600, as shown in FIG. 14, serves to provide the connection between the ends 604, 605 of the turns which are located on one side of the stator pole with the ends 704, 705, 706, 707 located on the other side of the same pole in order to define complete turns around this pole. This connection is made via tracks 801, 802 extending inside the printed circuit, between the connection pads 614-616 and the pads 714-716. In parallel, the turns extending out to the ends 609, 709 can be connected to the supply system, or to the other coils by the pads 620, 630 located on the upper surface of the connection components 600. The tracks 801, 802 shown in FIG. 11 are given as an example, and the exact positioning thereof and also the determination of the corresponding connection pads will be explained below in detail.

The printed circuit can advantageously be a multilayer circuit board allowing the layout of conductive tracks on different levels and in particular allowing several geometrically parallel tracks to be made parallel electrically in order to increase the conductive section between two connection pads. It is also possible to expand the tracks in order to increase this section to meet the needs.

Figure 15:
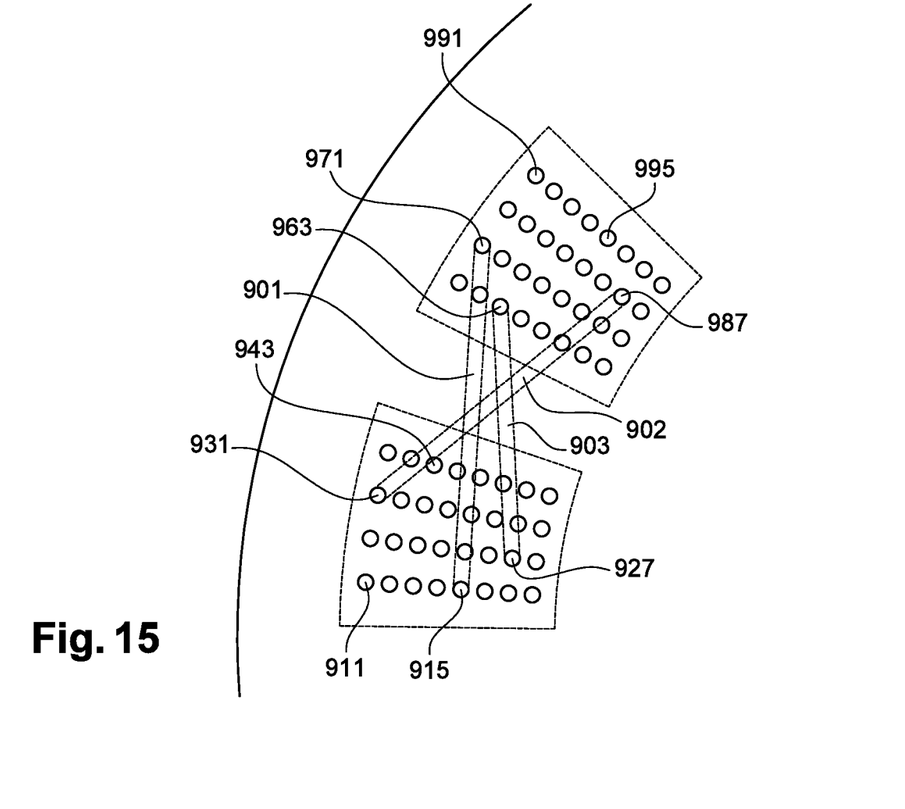
FIG. 15 is a schematic top view showing the connection component from FIG. 13, along with some conductive tracks connecting elemental turns.

As shown schematically in FIG. 15, the tracks 901, 902, 903 serve to connect the ends of partial turns which are not located on layers of directly adjacent turns. More precisely, the track 901 serves to connect the end 915 of the partial turn formed by the conductive portion between the ends 915, 995, with the end 971, belonging to the turn extending between the ends 971 and 931. Additionally, the track 902 serves to connect the end 931 with the end 987, belonging to the turn extending to the end 927. For its part, the track 903 connects the end 927 of the turn mentioned above with the end 963 belonging to the turn extending to the end 943. It is also observed that the successive turns of this overall winding are not located on adjacent layers (in the radial direction), but are distinctly more separated. It follows that the parasitic capacitance present between two consecutive turns is very distinctly reduced, such that the normal or natural modes of the coil, evaluated considering elemental inductances of each turn and parasitic capacitances existing between each turn, are located at distinctly higher frequencies. It follows that the motor made that way can be supplied from systems with voltages generated by PWM type systems operating at switching frequencies distinctly higher than in the prior art.

In practice, the routing with which to determine the optimal positioning of the tracks can be obtained by an optimization process aiming to minimize the parasitic capacitances or to increase the natural frequencies of the coil.

As an example, this process can implement the definition of a mathematical distance considering the degree of proximity of two half-turns to be interconnected, for example a function of the coordinates measuring the standard deviation between the length of the interconnection segment connecting the two half-turns to be interconnected and the length of the segment which would short-circuit the half-turn itself.

This process requires defining a criterion to be optimized which, from the perspective of the effects of proximity, can for example be a total distance corresponding to the sum of said elemental mathematical distances for the entire coil.

The resolution of the optimization problem consists in minimizing this total distance if one focuses on the effects of proximity. According to the targeted application, the optimization of the frequency performances and/or optimization of the losses by conduction are sought. In this case, the question can advantageously be approached from a multiple criteria aspect, in order notably to concurrently minimize the effects of proximity and the additional resistances related to the total length of the interconnection circuits; two criteria that can appear to be competing.

Of course, in variants not shown, the various partial elemental turns are not necessarily connected to each other within a coil assigned to a single pole. In that way the disclosed embodiments also cover variants in which the coil is constructed by combining turns present on different poles, with the result in particular of very greatly reducing, or even making negligible, the parasitic capacitance between adjacent turns.

From the preceding, it can be seen that the presently disclosed embodiments serve to produce electric motors for which the level of filling of the stator by stator coils is particularly high. Another major advantage is to allow operation with switching frequencies that are also particularly high and a reduction of the intensity of common-mode parasitic currents circulating in the machine and its environment. Another industrial advantage relates to the reproducibility of the electrical parameters and in particular the withstand voltage, because of the deterministic construction of the coils.

The invention claimed is:

1. A method for producing an electric motor stator, comprising a stator magnetic circuit comprising a plurality of radial polar protuberances, the method comprising the following steps:

producing in a block of conductive material a plurality of through-cuts, defining a set of generally U-shaped, mechanically secured conductive zones around respective one or more central openings;

insertion of said set of conductive zones into the magnetic circuit with a substantially axial movement until the plurality of polar radial protuberances fills the one or more central openings of said set of conductive zones;

attachment on said set of conductive zones of one or more connection components, comprising a plurality of conducting tracks connected to distinct ends of said conductive zones, so as to define a DC electrical circuit forming a winding around one or more radial polar protuberances.

2. The method according to claim 1, further comprising a step consisting of providing for the securing of the conductive zones by an electrically insulating material.

3. The method according to claim 2, wherein the set of conductive zones is dipped into an insulating resin bath.

4. The method according to claim 1, further comprising a step consisting of separating the set of conductive zones from a portion of the block of conductive material providing the secure hold of these conductive zones while the cuts are made.

5. The method according to claim 1, wherein one set of conductive zones is made per polar protuberance of the magnetic circuit of the stator, where said sets are then individually inserted into the magnetic circuit.

6. The method according to claim 1, wherein a plurality of sets of conductive zones are made in a single block of conductive material, where said plurality is then inserted into the magnetic circuit on several polar protuberances.

7. The method according to claim 1, wherein the cuts are made using a technique chosen from the group consisting of electro-erosion, water jet cutting, and laser cutting.

8. The method according to claim 1, wherein the cuts are radial, passing through a virtual axis of the stator, and separate concentric turns associated with a single polar protuberance.

9. The method according to claim 1, wherein the through-cuts are along parallel planes and parallel to a virtual axis of the stator, and separate concentric turns associated with a single polar protuberance.

10. The method of claim 1, wherein the through-cuts are cylindrical and centered on a virtual axis of the stator, and separate radially offset turns associated with a single polar protuberance.

11. The method of claim 1, wherein the through-cuts are flat and parallel to a virtual axis of the stator, and separate radially offset turns associated with a single polar protuberance.

* * * * *